(No Model.)

R. E. BEAN.
SCORE CARD.

No. 453,754.                      Patented June 9, 1891.

Witnesses
W. B. Howe
John H. Stone

Inventor
Rufus E. Bean
By his Attorney J. B. Thurston

UNITED STATES PATENT OFFICE.

RUFUS E. BEAN, OF FRANKLIN, NEW HAMPSHIRE.

SCORE-CARD.

SPECIFICATION forming part of Letters Patent No. 453,754, dated June 9, 1891.

Application filed December 2, 1890. Serial No. 373,356. (No model.)

*To all whom it may concern:*

Be it known that I, RUFUS E. BEAN, a citizen of the United States, residing at Franklin, in the county of Merrimac and State of New Hampshire, have invented certain new and useful Improvements in Score-Cards, of which the following is a specification.

The object of this invention is to provide a convenient means for those delivering milk and ice daily, or even occasionally, to consumers, whereby the regular and extra amount delivered may be correctly recorded with equal satisfaction to the dealer and the consumer.

The invention consists in a card on which is plainly printed the name of dealer from whom the article is purchased, the month and year, the days of month, and, if desired, the days of week also, with space at either side of the latter in which the delivery-clerk may punch one or more holes representing the quantity or the extra quantity of any articles—such as milk or ice—left with the customer on a given day, as will be more fully explained in the following specification and claims, and clearly illustrated in the accompanying drawing, forming a part thereof, in which is represented a milk-dealer's account-card for the month of November, 1890.

The card is intended to be left with a customer, who places it in convenient reach of the delivery-clerk. Consumers of milk or ice usually know how much they shall require regularly each day; but they occasionally want a little extra, and it is in keeping account of the extra quantities that errors are liable to occur.

The drawing represents a milk-dealer's account-card on which the name of the dealer, "Richard Doe," is printed at the top. Then follows the month and year. The customer, John Roe, wishes two quarts of milk delivered to him daily. So at the left of the printed words "per day" the dealer places the word or figure "2." The days of the month are arranged in a column in center of card, headed by the word "extra." To the left of this column of figures is a space for recording the extra quarts, and to the right is a space for recording extra pints. There being but thirty days in November, 1890, John Roe would consume sixty quarts of milk that month if nothing extra had been ordered; but on the fifth day it will be seen by the drawing that in the space A for recording quarts one hole *a* has been punched. On the eighth, in the space B for recording pints, one hole *b* has been punched. On the tenth are seen two holes *a*. On the seventeenth one hole *b* has been punched, and on the twenty-first another hole *a* is seen in the quart-column. At the end of month the delivery-clerk has only to count the holes in each of the spaces A B and place the proper figures underneath, which in the present case is "4" under the A column, and "2" under the B column, showing that John Roe has received five quarts of milk extra in November, which, added to the regular delivery of two quarts daily, makes a total of sixty-five quarts. It is intended to print something in form of a bill along one side of card, as shown in drawing, so that the dealer has only to insert the name of customer, number of quarts, price per quart, total amount, and receipt for same upon card when receiving his pay at end of month.

Having described my invention, what I claim as new is—

A milk or ice account card provided at top with the month and year issued and a space for the insertion of the regular amount per day, a central column of figures representing the days of month or week, the column of figures corresponding in numbers with the number of the days of the month printed at the top of the card, space at either side for recording opposite a given date the extra quantity delivered to a customer, and space for entering the total and receipting for same at end of month.

In testimony whereof I affix my signature in presence of two witnesses.

RUFUS E. BEAN.

Witnesses:
J. B. THURSTON,
NATHL. E. MARTIN.